(12) United States Patent
Thies et al.

(10) Patent No.: US 12,188,803 B2
(45) Date of Patent: Jan. 7, 2025

(54) FILLING DEVICE

(71) Applicant: Glatt Gesellschaft mit beschränkter Haftung, Binzen (DE)

(72) Inventors: Jochen Thies, Loerrach (DE); Mirko Nowak, Loerrach (DE)

(73) Assignee: Glatt Gesellschaft mit beschränkter Haftung, Binzen (DE)

(*) Notice: Subject to any disclaimer, the term of this patent is extended or adjusted under 35 U.S.C. 154(b) by 0 days.

(21) Appl. No.: 17/782,407

(22) PCT Filed: Nov. 16, 2020

(86) PCT No.: PCT/EP2020/082203
§ 371 (c)(1),
(2) Date: Jun. 3, 2022

(87) PCT Pub. No.: WO2021/110394
PCT Pub. Date: Jun. 10, 2021

(65) Prior Publication Data
US 2023/0012062 A1    Jan. 12, 2023

(30) Foreign Application Priority Data
Dec. 6, 2019 (DE) .................. 10 2019 219 020.0

(51) Int. Cl.
*G01F 11/40* (2006.01)
*G01F 15/00* (2006.01)

(52) U.S. Cl.
CPC ............ *G01F 11/40* (2013.01); *G01F 15/001* (2013.01)

(58) Field of Classification Search
CPC .......... G01F 11/38; G01F 11/40; G01F 11/46; G01F 3/36; G01F 11/20; G01F 15/001; B65B 3/323

USPC ....................................................... 222/168.5
See application file for complete search history.

(56) References Cited

U.S. PATENT DOCUMENTS

| 1,891,038 | A |   | 12/1932 | Barros |
|---|---|---|---|---|
| 2,318,725 | A |   | 5/1943 | Thomas |
| 4,006,842 | A | * | 2/1977 | Bassignani ............. G01F 11/40 222/43 |
| 4,109,835 | A |   | 8/1978 | Castro |
| 5,746,355 | A | * | 5/1998 | Wold ...................... A47G 19/34 222/441 |
| 5,855,300 | A | * | 1/1999 | Malki ..................... G01F 11/18 222/565 |
| 6,374,875 | B1 |   | 4/2002 | Schroeder et al. |
| 2002/0125275 | A1 | * | 9/2002 | Smith .................... G01F 11/22 222/575 |
| 2010/0193548 | A1 |   | 8/2010 | Poreda et al. |
| 2014/0144926 | A1 |   | 5/2014 | Wolf |

FOREIGN PATENT DOCUMENTS

| DE | 498722 | 5/1930 |
| DE | 79533 | 5/1984 |
| DE | 8900871 U1 | 6/1990 |
| DE | 19953228 A1 | 5/2001 |
| JP | S5294850 | 1/1951 |
| WO | 2004003486 A1 | 1/2004 |
| WO | 2010032028 A1 | 3/2010 |

* cited by examiner

*Primary Examiner* — Vishal Pancholi
*Assistant Examiner* — Robert K Nichols, II
(74) *Attorney, Agent, or Firm* — The Webb Law Firm

(57) ABSTRACT

A filling device for dosing a defined amount of loose-type material with a filling unit including a basic body and a control device.

8 Claims, 5 Drawing Sheets

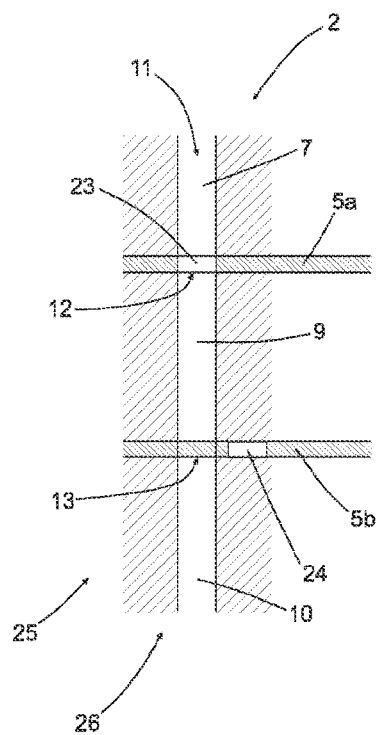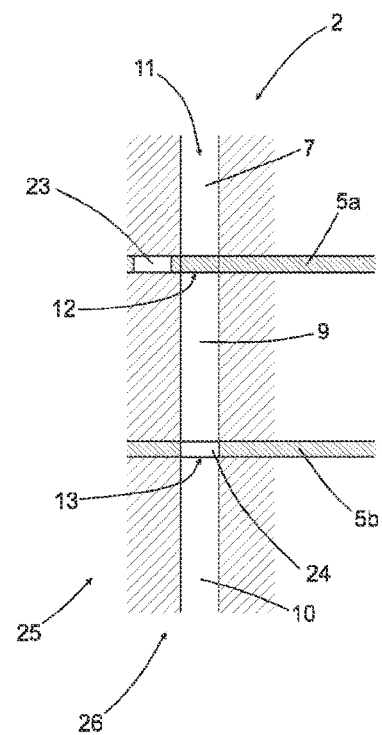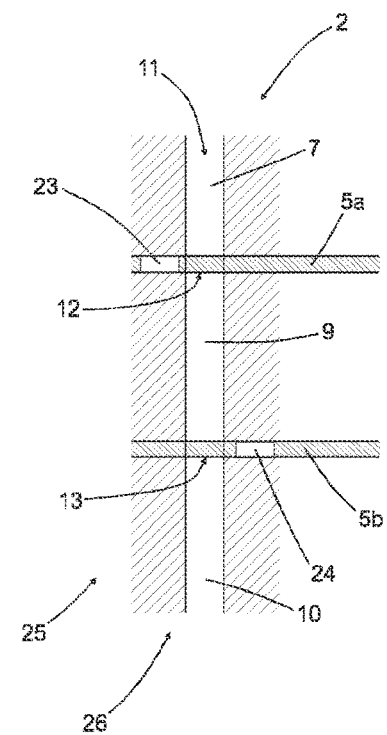
Fig. 7  Fig. 8  Fig. 9
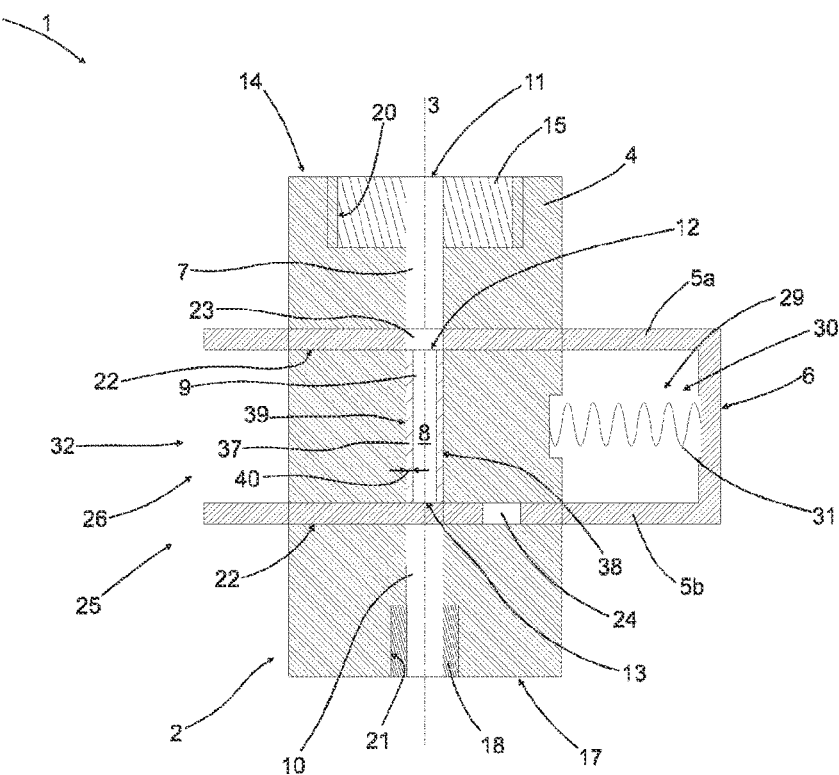
Fig. 10

FILLING DEVICE

CROSS-REFERENCE TO RELATED APPLICATIONS

This application is the United States national phase of International Application No. PCT/EP2020/082203 filed Nov. 16, 2020, and claims priority to German Patent Application No. 10 2019 219 020.0 filed Dec. 6, 2019, the disclosures of which are hereby incorporated by reference in their entirety.

BACKGROUND

Field

The invention relates to a filling device for dosing a defined amount of loose-type material.

Description of Related Art

Filling devices have belonged to the state of the art for a long time. Such filling devices are described below.

US 2010/0193548 A1 discloses a powder dispenser that has a casing which encloses a powder container and has a discharging opening, a powder plunger which is mounted displaceably inside the casing between a starting position, an intermediate position and an end position, wherein the powder plunger disposes of a discharging end which moves through the powder container, while the powder plunger moves from its starting position to its intermediate position, a dosing chamber which is formed when the powder plunger reaches its intermediate position, wherein the dosing chamber receives powder when the powder plunger moves from its starting position to its intermediate position, a powder barrier with a closed position and an open position, while the powder barrier in its closed position prevents powder from exiting through the dosing opening, wherein the powder barrier moves from its closed position to its open position when the powder plunger moves from its intermediate position to its end position, wherein the powder plunger presses the power contained in the dosing chamber out of the dispenser and through the dosing opening when the powder plunger moves from its intermediate position to its end position.

WO 2010/032028 A1 discloses a portable applicator for discharging powder comprising: a powder container with a first end and a second end; an outlet pipe fastened onto the second end of the container and through which powder can be discharged from the container; a controller with an outlet which is fastened onto the first end of the container, directly or by means of a lance; an outlet from the controller; means that are integrated in the controller, comprising a holder for a source of compressed gas to be accommodated inside the controller or a separate source of compressed gas which should be coupled to the outlet of the controller; and valve means which are integrated in the controller and allow operation such that the source of compressed gas, whether contained in the holder or otherwise, can be coupled with the outlet of the controller and from there to the inside of the dispenser, whether directly or by means of a lance.

US 2014/0144926 A1 discloses a powder dosing unit having a plurality of chambers, wherein the chambers have the same volume and can be displaced relative to the cover of the powder dosing unit by means of an actuating mechanism, such that the powder is dosed through an outlet. This ensures exact dosing of solid substances, often in powder form, wherein the powder dosing unit embodiments comprise both portable and electrically operated systems.

The disadvantage of the abovementioned technical solutions is the complex construction and that only the same volume of powder can be dosed with the powder dispenser.

SUMMARY

The task of the invention is therefore to develop and to provide a filling device which has a simple construction and at the same time better dosing accuracy and preferably allows dosing of different volumes.

This task is resolved with a filling device of the type mentioned at the start, in that the filling device comprises a filling unit with a basic body rotating symmetrically around an axis of rotation and a control device having two controlling arms, wherein the basic body has, passing through it, at least one inlet section extending in the axial direction of the axis of rotation, a dosing channel section having a defined volume and a dosing channel comprising an outlet section, wherein each dosing channel has a dosing channel section inlet and a dosing channel section outlet, and wherein the basic body comprises at a first end a first intake unit for a storage container for loose-type material arranged on the filling unit and at an end opposite the first end, a second intake unit for an intake receptacle for loose-type material arranged on the filling unit and wherein the basic body possesses two controlling arm guides for accommodating the controlling arms displaceable therein of the controlling device, wherein the first controlling arm has a dosing channel section inlet opening associated with the dosing channel section inlet and the second controlling arm has a dosing channel section outlet opening associated with the dosing channel section outlet and wherein the control device can be selectively brought into different shift positions by displacement, wherein a shift position is the inlet position in which, when the control device is brought there, the dosing channel section inlet opening releases the dosing channel section inlet associated with it to fill the dosing channel, and at the same time, the dosing channel section outlet is closed, and wherein a shift position is the outlet position in which, when the control device is brought there, the dosing channel section inlet is closed and at the same time the dosing channel section outlet opening releases the dosing channel section outlet associated with it. The advantage of the filling device resides in the fact that the filling device has a simple construction and nevertheless allows exact dosing of a defined volume, whereby the manufacturing costs can be significantly reduced.

In a configuration of the filling device advantageous in this regard, the shift position is a closed position in which, when the control device is brought to the closed position, the dosing channel section inlet and the dosing channel section outlet are closed at the same time. This is advantageous in that, in the closed position, the dosing channel section of the dosing channel is fully closed by the controlling arms of the control device, such that no contamination is caused when changing a storage receptacle or the intake receptacle.

The filling device furthermore has an energy storing device, which is arranged between the basic body and the control device such that the control device is preloaded in a basic position. Advantageously, the filling device is thus always in the same shift position before use, namely in the basic position. The basic position is expediently the inlet position or the closed position.

According to an additional further development of the filling device, the energy storing device is formed as a spring element, preferably as a coil spring. A spring element formed as a coil spring that acts as an energy storing device is affordable and can easily be fitted in the filling device.

According to a further advantageous configuration of the filling device, the basic body is formed in several parts, wherein the basic body has a dosing channel body rotatable around the axis of rotation, the body possessing a plurality of dosing channel sections with different defined volumes. This gives rise to the possibility of dosing different volumes with a filling device. Expediently, each of the different dosing channel sections with a defined volume can be locked in the dosing channel of the basic body by rotation around the axis of rotation. The installed locking mechanism allows the dosing channel section having an appropriately defined volume to be selected and to be positioned easily in the dosing channel.

The first and/or the second intake unit preferably have/has a thread or a fit for arranging the storage receptacle for loose-type material and/or the intake receptacle for loose-type material. The loose-type material is supplied for dosing through the storage receptacle, preferably a sampling glass, which can be easily connected to the filling unit of the filling device through the intake unit configured with a thread. The above also applies to the intake receptacle, which is preferably formed as a kind of test tube or straw.

An additional advantageous further development of the filling device has a volume adjusting device for adjusting the defined volume in the dosing channel section. The volume adjusting device is preferably formed as at least one insert that can be fitted in the dosing channel section of the dosing channel. The at least one insert is expediently formed as a hollow cylinder having a wall thickness. It is furthermore preferable to form the volume adjusting device as a wall of the dosing channel section at least partially adjustable through an actuating mechanism. This gives rise to the possibility of matching the defined volume easily to the required volumes for dosing the loose-type material.

BRIEF DESCRIPTION OF THE DRAWINGS

The invention is described in more detail below by means of the attached drawings. These show.

DETAILED DESCRIPTION

Figure 1:
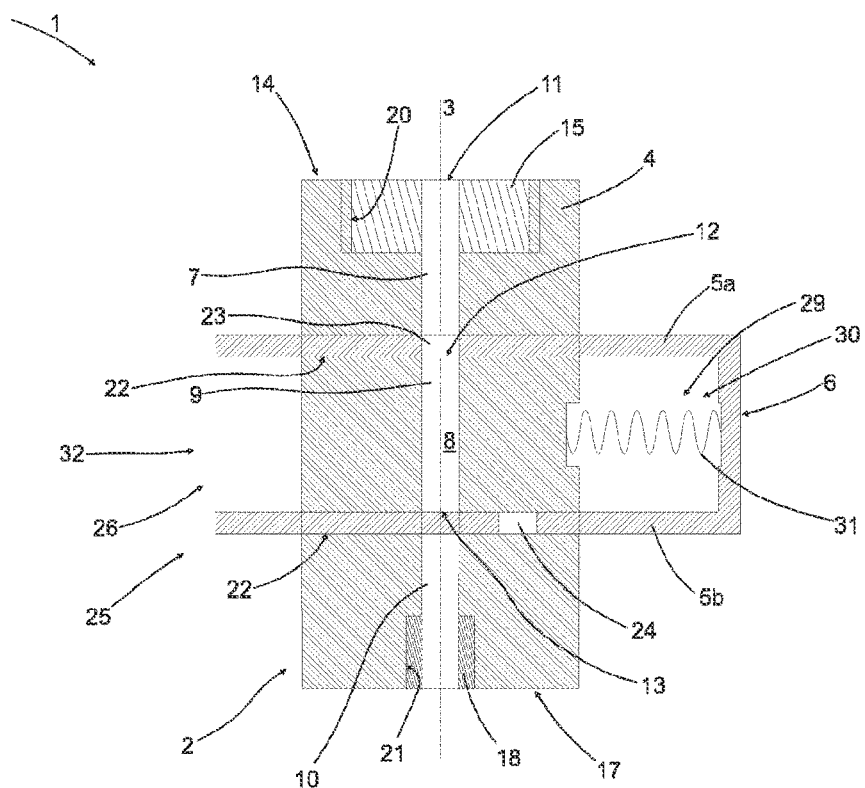
FIG. 1 a section through a first embodiment example of a filling unit of a filling device, FIG. 2 a section through the basic body of the filling unit according to the first embodiment example, FIG. 3 a top view of the filling unit of the filling device according to the first embodiment example, FIG. 4 a section through a filling device with storage and intake receptacles according to the first embodiment example arranged thereon, FIG. 5 a top view of a second embodiment example of a filling unit of a filling device, FIG. 6 a section through the filling unit of the filling device according to the second embodiment example, FIG. 7 a diagrammatic illustration of the filling unit in a shift position designated as an inlet position, FIG. 8 a diagrammatic illustration of the filling unit in a shift position designated as an outlet position, FIG. 9 a diagrammatic illustration of the filling unit in a shift position designated as a closed position, FIG. 10 a section through a first embodiment example of a filling unit of a filling device with an insert as a volume adjusting device formed as a hollow cylinder, FIG. 11 a section through a first embodiment example of a filling unit of a filling device with a wall of the dosing channel section partially adjustable by means of an actuating mechanism as a volume adjusting device.
Figure 2:
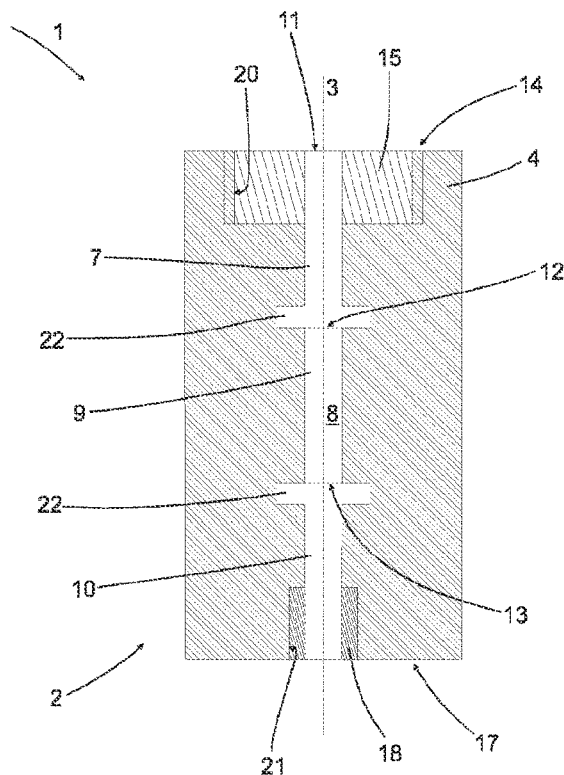
Figure 3:
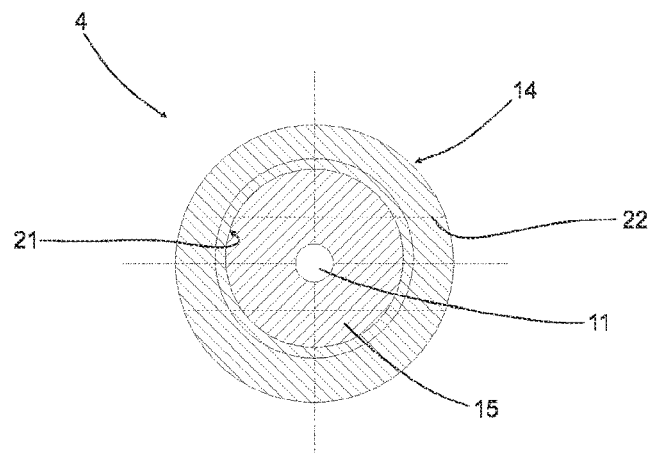
Figure 4:
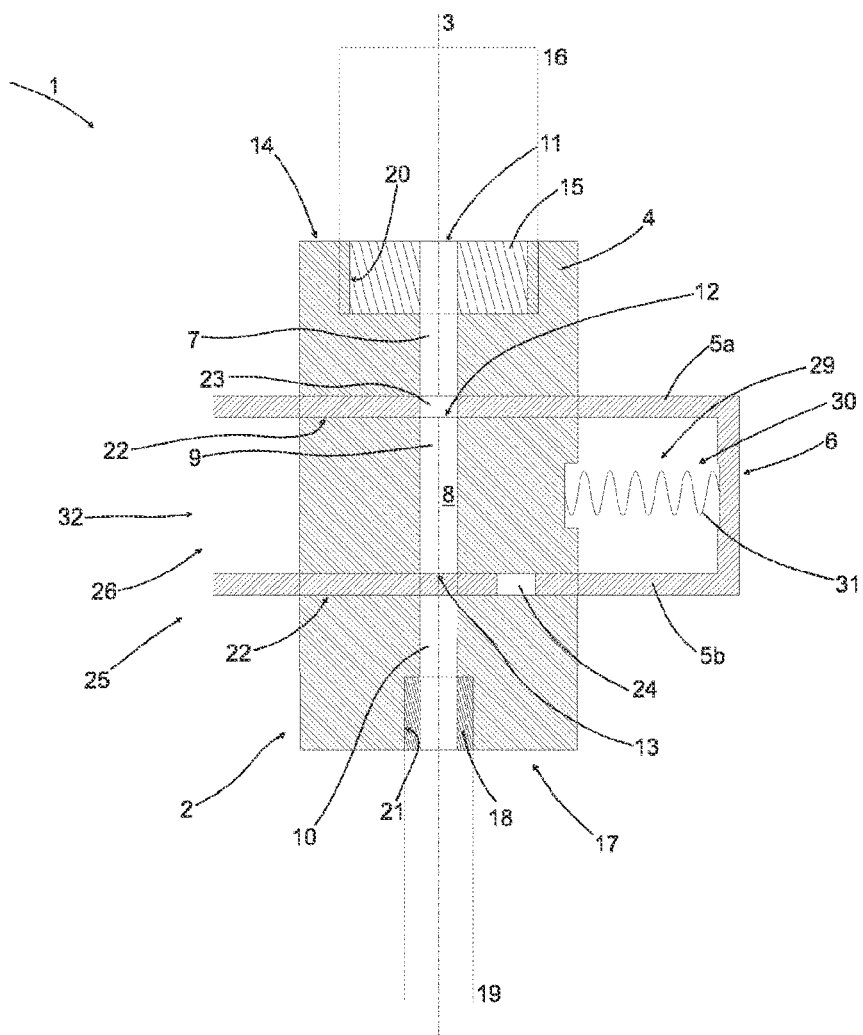

Provided that no different disclosures are made, the following description refers to all embodiments of a filling device 1 according to the invention illustrated in the drawing for dosing a defined amount of loose-type material.

The filling device 1 comprises a filling unit 2 with a basic body 4 rotating symmetrically around an axis of rotation 3 and a control device 6 having two controlling arms 5.

The basic body 4 has, passing through it, at least one inlet section 7 extending in the axial direction of the axis of rotation 3, a dosing channel section 9 having an exactly defined volume 8 and a dosing channel 11 comprising an outlet section 10. Each dosing channel 11 has a dosing channel section inlet 12 and a dosing channel section outlet 13. The dosing channel 11 extends in a straight shape along the axis of rotation 3.

The basic body 4 comprises at a first end 14 a first intake unit 15 for a storage receptacle 16, in particular a sampling glass, for loose-type material that can be arranged on the filling unit 2. At an end 17 opposite the first end 14, the basic body 4 comprises a second intake unit 18 for an intake receptacle 19 for loose-type material that can be arranged on the filling unit 2. The first intake unit 15 in a preferred embodiment has a thread 20 for arranging the storage receptacle 16 for loose-type material. The storage receptacle 16 is accordingly screwed to the filling unit 2. In contrast, the second intake unit 18 in a preferred embodiment has a fit 21 for the intake receptacle 19 for loose-type material. The intake receptacle 19, for example a test tube or a straw, is thus clamped into the intake unit 18.

In the embodiment examples shown, the intake units 15 and 18 are arranged perpendicular to the axis of rotation 3. Other embodiment variants, such as angular to the axis of rotation 3, are not illustrated.

In other embodiment examples not illustrated, the intake units 15, 18 are respectively formed as a thread 20 or respectively as a fit 21.

The basic body 4 furthermore possesses two controlling arm guides 22 for accommodating the controlling arms 5 arranged displaceably therein of the controlling device 6. The two controlling arm guides 22 are arranged respectively perpendicular to the dosing channel 11.

Here, the first controlling arm 5a has a dosing channel section inlet opening 23 associated with the dosing channel section inlet 12 and the second controlling arm 5b has a dosing channel section outlet opening 24 associated with the dosing channel section outlet 13. The controlling arms 5a and 5b are preferably embodied parallel to each other.

The control device 6 can be selectively brought into different shift positions 25 by displacement. An inlet position 26, an outlet position 27 or a closed position 28 arise as shift positions 25.

FIG. 7 shows a diagrammatic illustration of the filling unit 2 in a shift position 25 designated as the inlet position 26. Here, when the first controlling arm 5a of the control device 6 is brought there, the dosing channel section inlet opening 23 releases the dosing channel section inlet 12 associated with it to fill the dosing channel 11, and at the same time, the dosing channel section outlet 13 is closed by the second controlling arm 5b of the control device 6.

A further shift position 25 is illustrated in FIG. 8 with a diagrammatic illustration of the filling unit 2 in a shift position 25 designated as the outlet position 27. When the control device 6 is brought to the outlet position 27, the dosing channel section inlet 12 is closed by the first controlling arm 5a and at the same time the dosing channel section outlet opening 24 arranged in the second controlling arm 5b releases the dosing channel section outlet 13 associated with it.

FIG. 9 shows the shift position 25 designated as the closed position 28, wherein when the control device 6 is brought into the closed position 28, both the dosing channel section inlet 12 and the dosing channel section outlet 13 are closed by the controlling arms 5 of the control device 6.

The filling device 2 expediently has an energy storing device 29. The energy storing device 29 is preferably formed as a spring element 30, preferably as a coil spring 31. In an embodiment example, not illustrated, the energy storing device 29 is formed as a damper.

The energy storing device 29 is preferably arranged between the basic body 4 and the control device 6 such that the control device 6 is preloaded in a basic position 32. The basic position 32 here is the inlet position 26 or the closed position 28.

Figure 5:
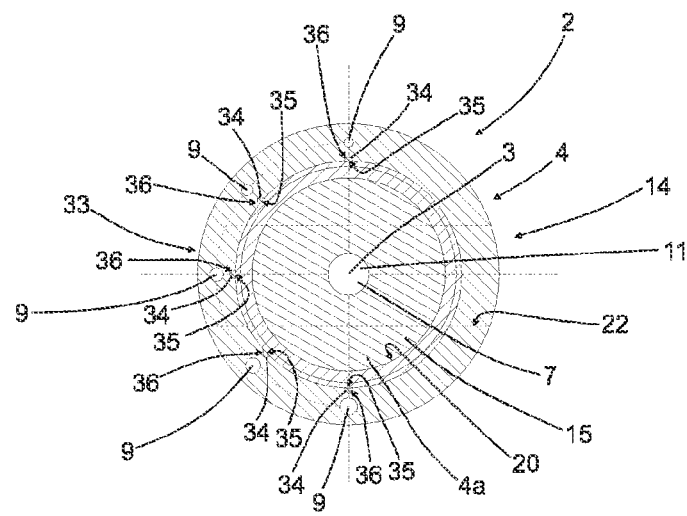
Figure 6:
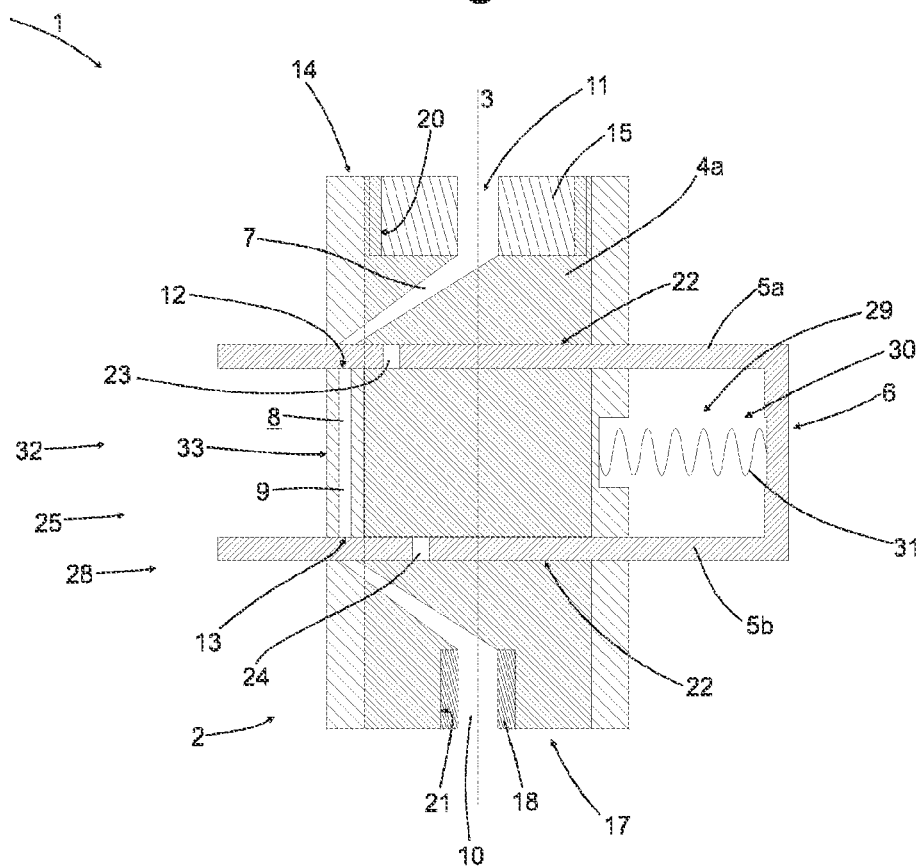

According to a further embodiment example illustrated in FIG. 5, the basic body 4 is formed in several parts. Here, the basic body 4 has a dosing channel body 33 rotatable around the axis of rotation 3, the body possessing a plurality of dosing channel sections 9 with different defined volumes 8. The dosing channel body 33 is rotated around the axis of rotation 3 relative to the basic body inner part 4a. In the embodiment example, the dosing channel body 33 has five dosing channel sections 9, respectively with a different defined volume 8. The volumes 8 of the dosing channel sections 9 can preferably be implemented from very small amounts of loose-type material in the nanogram range up to several grams. The five dosing channel sections 9 are arranged in the circumferential direction in the dosing channel body 33, wherein they are spaced from each other at an angle of 45°.

In FIG. 5, the inlet section 7 and the outlet section 10 extend for a short distance along the axis of rotation 3 before they extend further radially at an angle and outwards. The dosing channel section 9 arranged in the dosing channel body 33 extends parallel to the axis of rotation 3.

Each of the different dosing channel sections 9 with a defined volume 8 can be locked by rotation around the axis of rotation 3 in the dosing channel 11 of the basic body 4. To do this, the one basic body inner part 4a has protrusions 35 formed as locking catches 34 and the dosing channel body 33 has the recesses 36 corresponding to the protrusions 35. The locking mechanism formed by the protrusions 35 and the recesses 36 always ensures flush locking of the dosing channel section 9 in the dosing channel 11, such that the dosing channel section 9 can be filled with loose-type material. The rotation of the dosing channel body 33 can be driven manually or electrically.

An embodiment example of a filling device 1 is illustrated in FIG. 10, wherein in contrast to the filling device 1 shown in FIG. 1, an insert 38 of a volume adjustment device 39 formed as a hollow cylinder 37 is located in the dosing channel section 9. The defined volume 8 in the dosing channel section 9 is changed by the hollow cylinder 37 having a wall thickness 40 and is therefore adjustable. Several inserts 38 in the shape of hollow cylinders 37 are also conceivable. The volume 8 can be matched exactly to the required volume by installing hollow cylinders 37 with a different wall thickness 38.

Figure 11:
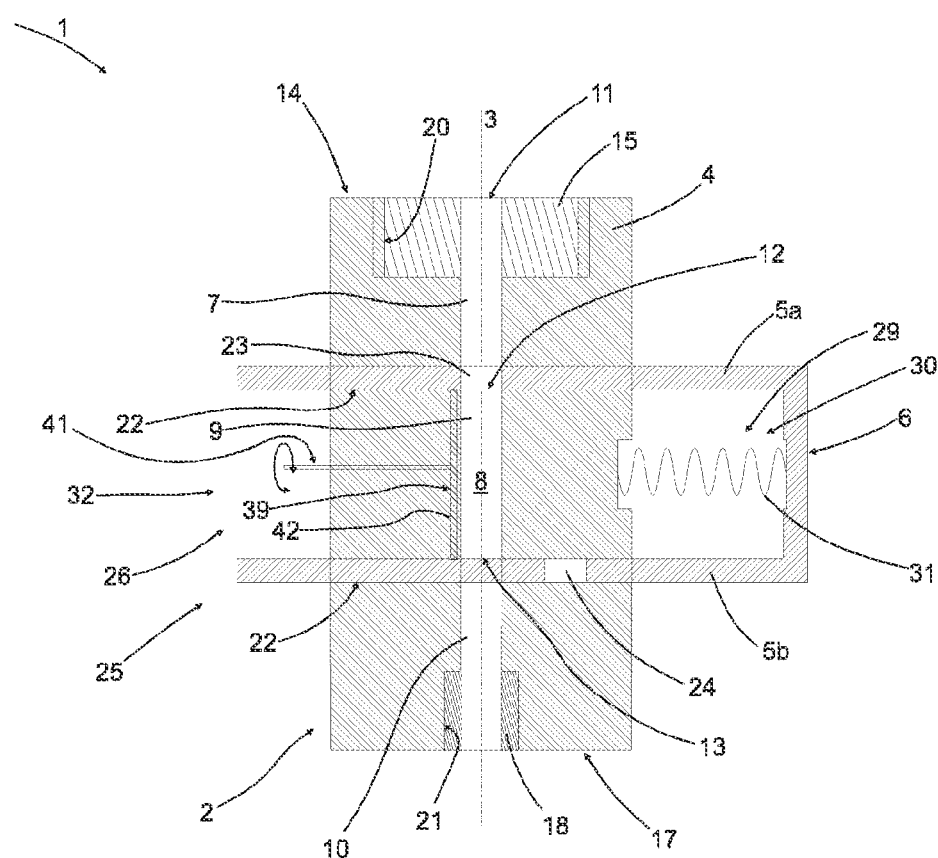

It is furthermore preferable for the volume adjustment device 39 to be formed as a wall 42 of the dosing channel section 11, at least partially adjustable by means of an actuating mechanism 41. This embodiment is illustrated in FIG. 11. A screw for example can act as an actuating mechanism 41. The volume 8 of the dosing channel section 9 becomes larger or smaller according to the direction of turn of the screw.

The invention claimed is:

1. A filling device for dosing a defined amount of loose-type material, comprising:
    a filling unit with a basic body rotating symmetrically around an axis of rotation; and
    a control device having two controlling arms,
    wherein the basic body has, passing through it, at least one inlet section extending in the axial direction of the axis of rotation, a dosing channel section having a defined volume and a dosing channel comprising an outlet section,
    wherein the dosing channel has a dosing channel section inlet and a dosing channel section outlet,
    wherein the basic body comprises at a first end a first intake unit for a storage receptacle for loose-type material arranged on the filling unit and at an end opposite the first end, a second intake unit for an intake receptacle for loose-type material arranged on the filling unit,
    wherein the basic body possesses two controlling arm guides for accommodating the controlling arms displaceable in the controlling arm guides of the controlling device, wherein a first controlling arm of the two controlling arms has a dosing channel section inlet opening associated with the dosing channel section inlet and a second controlling arm of the two controlling arms has a dosing channel section outlet opening associated with the dosing channel section outlet,
    wherein the control device can be selectively brought into different shift positions by displacement, wherein the shift position is an inlet position in which, when the control device is brought there, the dosing channel section inlet opening releases the dosing channel section inlet associated with it to fill the dosing channel, and at the same time, the dosing channel section outlet is closed, and wherein the shift position is an outlet position in which, when the control device is brought there, the dosing channel section inlet is closed and at the same time the dosing channel section outlet opening releases the dosing channel section outlet associated with it,
    wherein the basic body is formed in several parts, wherein the basic body has a dosing channel body rotatable around the axis of rotation, the body possessing a plurality of dosing channel sections with different defined volumes, and
    wherein each of the plurality of dosing channel sections with different defined volumes can be locked in the dosing channel of the basic body by rotation around the axis of rotation,
    wherein the filling device further comprises an energy storing device in the form of a spring arranged between the basic body and the control device that provides a common biasing force to the first controlling arm and the second controlling arm, and
    wherein the first controlling arm and the second controlling arm move in synchronization with one another between the different shift positions by displacement of the energy storing device.

2. The filling device according to claim 1, wherein the shift position is a closed position in which, when the control device is brought to the closed position, the dosing channel section inlet and the dosing channel section outlet are closed at the same time.

3. The filling device according to claim 1, wherein the filling device further comprises an energy storing device, which is arranged between the basic body and the control device such that the control device is preloaded in a basic position.

4. The filling device according to claim 3, wherein the basic position is the inlet position or the closed position.

5. The filling device according to claim 3, wherein the energy storing device is formed as a spring element.

6. The filling device according to claim 5, wherein the spring element is a coil spring.

7. The filling device according to claim 1, wherein the first and/or the second intake unit comprise/comprises a thread or a fit for arranging the storage receptacle for loose-type material and/or the intake receptacle for loose-type material.

8. The filling device according to claim 1, wherein the locking mechanism comprises protrusions formed as locking catches on a basic body inner part and recesses corresponding to the protrusions formed on the dosing channel body, wherein each of the plurality of dosing channel sections is locked in the dosing channel in a flush configuration.

* * * * *